United States Patent [19]

Olster et al.

[11] Patent Number: 4,589,564

[45] Date of Patent: May 20, 1986

[54] PRESSURE VESSEL OPENING SEAL

[75] Inventors: Elliot F. Olster, Orange; Vance A. Chase, Oxford, both of Conn.

[73] Assignee: United Technologies Corporation, Hartford, Conn.

[21] Appl. No.: 720,198

[22] Filed: Apr. 4, 1985

[51] Int. Cl.[4] .................. B65D 41/04; B65D 45/00; F16J 13/00

[52] U.S. Cl. ........................... 220/3; 220/67; 220/288; 220/327; 220/378

[58] Field of Search ............... 220/327, 328, 67, 288, 220/3, 378

[56] References Cited

U.S. PATENT DOCUMENTS

| | | | |
|---|---|---|---|
| 1,896,519 | 2/1933 | Kendall | 220/288 |
| 1,958,582 | 5/1934 | Kerr et al. | 220/288 X |
| 2,519,572 | 8/1950 | Hill | 220/327 X |
| 2,800,242 | 7/1957 | Sauthoff | 220/327 X |
| 2,857,073 | 10/1958 | Tinker | 220/67 X |

FOREIGN PATENT DOCUMENTS 78514 3/1919 Fed. Rep. of Germany ...... 220/288

*Primary Examiner*—Allan N. Shoap
*Attorney, Agent, or Firm*—Gerald E. Linden

[57] ABSTRACT

A high pressure vessel (19), having a curved end piece (22) and an access plug (20) threaded into a recessed hole (26) in the end piece and sealed therein by a weld (46) disposed around the periphery of the plug, is provided with an annular lip (28) around the access hole. The flask lip has a sloped surface (34) that cooperates with the lip (38) of a cap (36) that is clamped to the vessel so that the clamping force on the cap is directed by the sloped surface through the weld to precompress the weld, thereby relieving the tensile stresses on the weld which result from pressure inside the vessel acting inside the hemispherical end piece of the vessel.

1 Claim, 3 Drawing Figures

PRESSURE VESSEL OPENING SEAL

DESCRIPTION

TECHNICAL FIELD OF THE INVENTION

The invention relates to sealing by welding the opening of a high pressure vessel.

BACKGROUND OF THE INVENTION

Newer submarines utilize large, such as 84 and 167 cubic foot, air vessels (flasks). Typically, they are made up from a short cylindrical midbody section, capped by curved, generally hemispherical end pieces. Each flask contains a supply and discharge pipe fitting, an internal drain assembly, and an access plug in one of the hemispherical end pieces. The access plug is necessary for inspecting and maintaining the flask and also for installing the internal drain assembly. Currently, a 15½ inch clear opening has been selected for the access plug because it is the smallest diameter through which a workman can enter and is large enough for tooling. The access plug is threaded into the curved end portion of the flask, and then welded in place to prevent leakage through the threads.

The flasks are designed to withstand an internal operating pressure of 5,000 psi and a test pressure of 8330 psi. The access plug threads react loads normal to the plug, but the curved interior of the vessel results in forces directed otherwise. Consequently the weld, or seal, is subject to tensile forces which can lead to failure thereof.

DISCLOSURE OF THE INVENTION

Therefore, it is an object of this invention to reduce the tensile stresses in the access plug seal weld.

According to the invention, a high pressure vessel, having a curved end piece and an access plug threaded into an access hole therein and sealed therein by a weld disposed around the periphery of the plug, is provided with an annular lip around the access hole. The lip has a sloped surface that cooperates with the lip of a cap that is clamped to the flask so that the clamping force on the cap is directed by the sloped surface through the weld to precompress the weld, thereby relieving the tensile stresses on the weld which result from pressure inside the vessel acting inside the curved end of the flask.

According to an aspect of the invention, a stop is provided in the access hole, and the stop/plug interface is provided with an O-ring to enhance the plug seal. Another O-ring can be provided at a cap/vessel interface to further enhance the seal.

Other objects, features and advantages of the invention will become more apparent in light of the following description thereof.

BEST MODE FOR CARRYING OUT THE INVENTION

Figure 1:
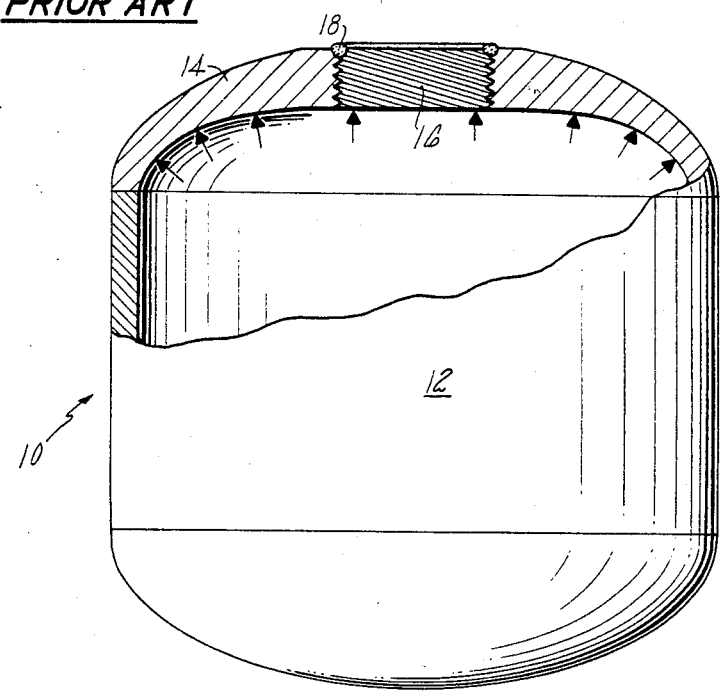
FIG. 1 is a cross-sectional side view of a prior art pressure vessel.

FIG. 1 shows a pressure vessel 10 having a cylindrical midsection 12 and a curved end piece 14. An access plug 16 is threaded into the end piece and welded therein as indicated by a bead 18 around the periphery of the access plug. The pressure inside the vessel is several thousand psi, and acts normal to the surface, as indiated by the arrows. As discussed previously, this results in undesirable tensile stresses on the weld.

Figure 2:
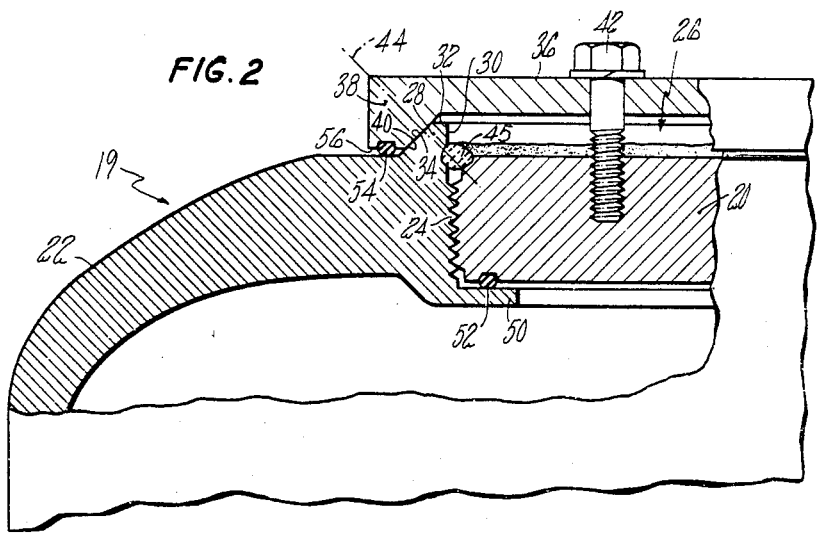
FIG. 2 is a cross-sectional side detail view of the pressure vessel opening seal of this invention.

FIG. 2 shows a cross section detail of the access plug/end piece interface in a pressure vessel 19. An access plug 20 is threaded into a curved end piece 22. The threads 24 in the end piece are recessed in the access hole 26 therein, which extends upwardly (outside of the vessel) to form an annular lip 28 around the circumference of the hole. The lip is three-edged; its inside edge 30 is in register with the hole 26, its top edge 32 is normal to the inside edge 30 and extends away from the hole 26, and its outside edge 34 is angled at greater than ninety degrees to the top edge 32 so that it presents a sloped surface away from the hole. As will be evident hereinafter, it is the slope of the outside edge 34, rather than the three-sidedness of the lip 28 that is germane to the invention.

A disc-like cap 36 is placed over the opening and is sized to extend past the flask lip 28. A downwardly extending annular lip 38 on the cap 36 has an inside face 40, extending towards the flask, the dimension of which corresponds to the outside dimension of the flask cap lip 28, measured at its outside edge 34. Furthermore, the angle of the face 40 corresponds to the angle of the outside edge 34 so that when the cap is forced down onto the flask, the face 40 and edge 34 cooperate in a wedge-like manner to compress the flask lip 28. The downward force on the cap 36 is suitably applied by bolts 42 extending through the cap into the plug, as shown.

When the cap is forced down onto the flask, the resulting force is generally along an axis 44, through the weld 45, and the angle of the lip 28/lip 38 interface is selected so that the resulting force is opposite the force from pressure within the vessel. Thus, the weld is precompressed, and the magnitude of the precompression can be selected to completely relieve the tensile stress thereon. This results in improved weld durability.

Since the pressure in the flask may be cyclic, the weld 45 is subject to low cyclic stress levels despite the precompression. Therefore, a preferred location for the weld would be along the virtual neutral axis of the closure system, and must be calculated according to actual flask parameters.

The flask has a stop 50, in other words a region of reduced inner diameter, incorporated in the access hole 26 which establishes an insertion limit for the plug 20. It is convenient to provide an O-ring groove in either the stop or the plug, and to insert and O-ring 52 therein, so that there is a seal by virture of full plug insertion. Likewise, it is convenient to provide an O-ring 54 in the outer flask-facing face 56 of the cap which seals against the flask when the cap is installed.

Figure 2A:
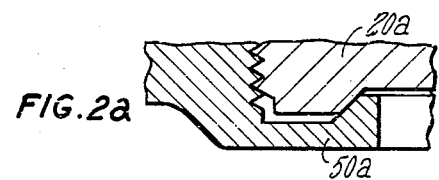
FIG. 2a is an alternate embodiment relating to FIG. 2.

As an alternate to the O-ring seal previously discussed, the plug and stop could cooperate in a tapered fit as shown in FIG. 2a (plug 20a, stop 50a).

What is claimed is:

1. A high pressure vessel (19) having a curved end (22) and an access plug (20) threaded into a hole (26) in the curved end and sealed therein by a weld (45) around the periphery of the access plug, characterized by:

an annular flask lip (29), disposed on the exterior of the vessel around the circumference of the hole, and having an outside edge (34) sloping at an angle away from the hole;

a disc-like cap (36), disposed over the hole (26) extending past the flask lip (28), and having a disc lip (38) sloping towards the flask at an angle corresponding to the angle of the outside edge (34) of the flask lip (28), the disc lip (38) contacting the outside edge (34) of the flask lip (28); and means (42) for applying a downward force on the cap (36), urging the disc lip (38) against the flask lip (28);

wherein the angle of the outside edge (34) of the flask lip (28) is selected to direct the downward force through the weld in opposition to forces through the weld resulting from pressure within the vessel.

* * * * *

UNITED STATES PATENT AND TRADEMARK OFFICE
CERTIFICATE OF CORRECTION

PATENT NO. : 4,589,564

DATED : May 20, 1986

INVENTOR(S) : ELLIOT F. OLSTER ET AL

It is certified that error appears in the above-identified patent and that said Letters Patent is hereby corrected as shown below:

Column 2, Line 54  After "insert" change "and" to --an--

Column 2, Line 67  "(29)" should be --(28)--

Signed and Sealed this

Third Day of March, 1992

Attest:

HARRY F. MANBECK, JR.

*Attesting Officer*    *Commissioner of Patents and Trademarks*